United States Patent
Cammas et al.

(10) Patent No.: US 9,451,280 B2
(45) Date of Patent: Sep. 20, 2016

(54) METHOD FOR ENCODING AND DECODING IMAGES, ENCODING AND DECODING DEVICES, CORRESPONDING DATA STREAMS AND COMPUTER PROGRAM

(75) Inventors: Nathalie Cammas, Sens de Bretagne (FR); Isabelle Amonou, Cesson-Sevigne (FR); Stéphane Pateux, Rennes (FR)

(73) Assignee: FRANCE TELECOM, Paris (FR)

( * ) Notice: Subject to any disclaimer, the term of this patent is extended or adjusted under 35 U.S.C. 154(b) by 746 days.

(21) Appl. No.: 13/380,386

(22) PCT Filed: Jun. 17, 2010

(86) PCT No.: PCT/FR2010/051213
§ 371 (c)(1),
(2), (4) Date: Dec. 22, 2011

(87) PCT Pub. No.: WO2010/149900
PCT Pub. Date: Dec. 29, 2010

(65) Prior Publication Data
US 2012/0106646 A1 May 3, 2012

(30) Foreign Application Priority Data
Jun. 23, 2009 (FR) .................................. 09 54289

(51) Int. Cl.
*H04N 7/12* (2006.01)
*H04N 11/02* (2006.01)
(Continued)

(52) U.S. Cl.
CPC .......... *H04N 19/543* (2014.11); *H04N 19/109* (2014.11); *H04N 19/139* (2014.11); *H04N 19/17* (2014.11); *H04N 19/176* (2014.11); *H04N 19/52* (2014.11)

(58) Field of Classification Search
None
See application file for complete search history.

(56) References Cited

U.S. PATENT DOCUMENTS 5,987,184 A * 11/1999 Kweon et al. ................ 382/250
5,995,668 A * 11/1999 Corset ....................... G06T 9/20
375/240.16

(Continued)

FOREIGN PATENT DOCUMENTS

WO 2009112742 A1 9/2009

OTHER PUBLICATIONS

International Search Report and Written Opinion dated Sep. 27, 2010 for corresponding International Application No. PCT/FR2010/051213, filed Jun. 17, 2010.

(Continued)

*Primary Examiner* — Joseph Ustaris
*Assistant Examiner* — Rebecca Volentine
(74) *Attorney, Agent, or Firm* — David D. Brush; Westman Champlin & Koehler, P.A.

(57) ABSTRACT

A method and apparatus are provided for encoding an image sequence. The method includes the following steps, for at least one group of blocks of an image: determining, for each block, at least one parameter characteristic of said block; forming at least one cluster including the blocks having at least one similar characteristic parameter; encoding the blocks of said cluster, the similar characteristic parameter(s) associated with said cluster being encoded only once; encoding the blocks that do not belong to any cluster, the characteristic parameter(s) associated with each of said blocks not being encoded; generating a data stream; and inserting into said stream, at least one piece of information on the partitioning of the group(s), in order to identify the outer block(s) within a group.

9 Claims, 5 Drawing Sheets

(51) Int. Cl.
  *H04N 11/04* (2006.01)
  *H04B 1/66* (2006.01)
  *H04N 19/543* (2014.01)
  *H04N 19/52* (2014.01)
  *H04N 19/139* (2014.01)
  *H04N 19/176* (2014.01)
  *H04N 19/109* (2014.01)
  *H04N 19/17* (2014.01)

(56) References Cited

U.S. PATENT DOCUMENTS

| | | | |
|---|---|---|---|
| 6,212,235 B1* | 4/2001 | Nieweglowski et al. | 375/240.08 |
| 6,633,611 B2* | 10/2003 | Sekiguchi | H04N 19/176 375/240.16 |
| 7,095,786 B1* | 8/2006 | Schonfeld et al. | 375/240.16 |
| 7,295,711 B1* | 11/2007 | Ahuja et al. | 382/225 |
| 7,602,851 B2* | 10/2009 | Lee et al. | 375/240.25 |
| 9,049,453 B2* | 6/2015 | Nakayama | H04N 19/176 |
| 2007/0086527 A1* | 4/2007 | Yan | 375/240.24 |
| 2009/0028245 A1* | 1/2009 | Vieron et al. | 375/240.16 |
| 2011/0007977 A1 | 1/2011 | Amonou et al. | |
| 2011/0129015 A1* | 6/2011 | Nguyen et al. | 375/240.16 |

OTHER PUBLICATIONS

Injong Rhee et al., "Quadtree-Structured Variable-Size Block-Matching Motion Estimation with Minimal Error" IEEE Transactions on Circuits and Systems for Video Technology, IEEE Service Center, Piscataway, NJ, US, vol. 9, No. 1, Feb. 1, 2000, XP011014015.

Kato S. et al., "Performance Evaluation on H. 26L-Based Motion Compensation with Segmented Multiple Reference Frames" Proceedings 2002 International Conference on Image Processing (CAT. No. 02CH37396) IEEE Piscataway, NJ, USA, vol. 1, 2002, pp. 1-661, XP002563364.

Tourapis, "Direct Prediction in P and B Frames" Joint Video Team (JVT) of ISO/IEC MPEG & ITU-T VCEG (ISO/IEC JTC1/SC29/WG11 and ITU-T SG16 Q6), XX, XX, No. JVT-C128, May 10, 2002, XP030005240.

French Search Report and Written Opinion dated Feb. 8, 2010 for corresponding French Application No. 0954289, dated Jun. 23, 2009.

English Translation of the International Preliminary Report on Patentability and Written Opinion dated Jan. 17, 2012 for corresponding International Application No. PCT/FR2010/051213, filed Jun. 17, 2010.

* cited by examiner

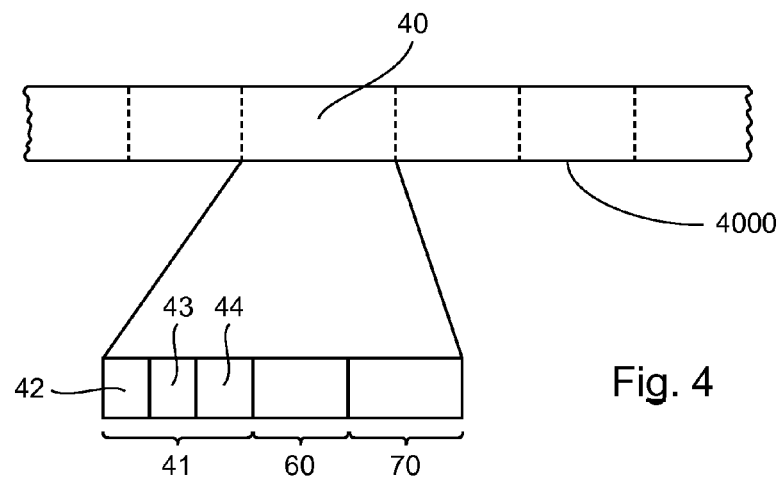
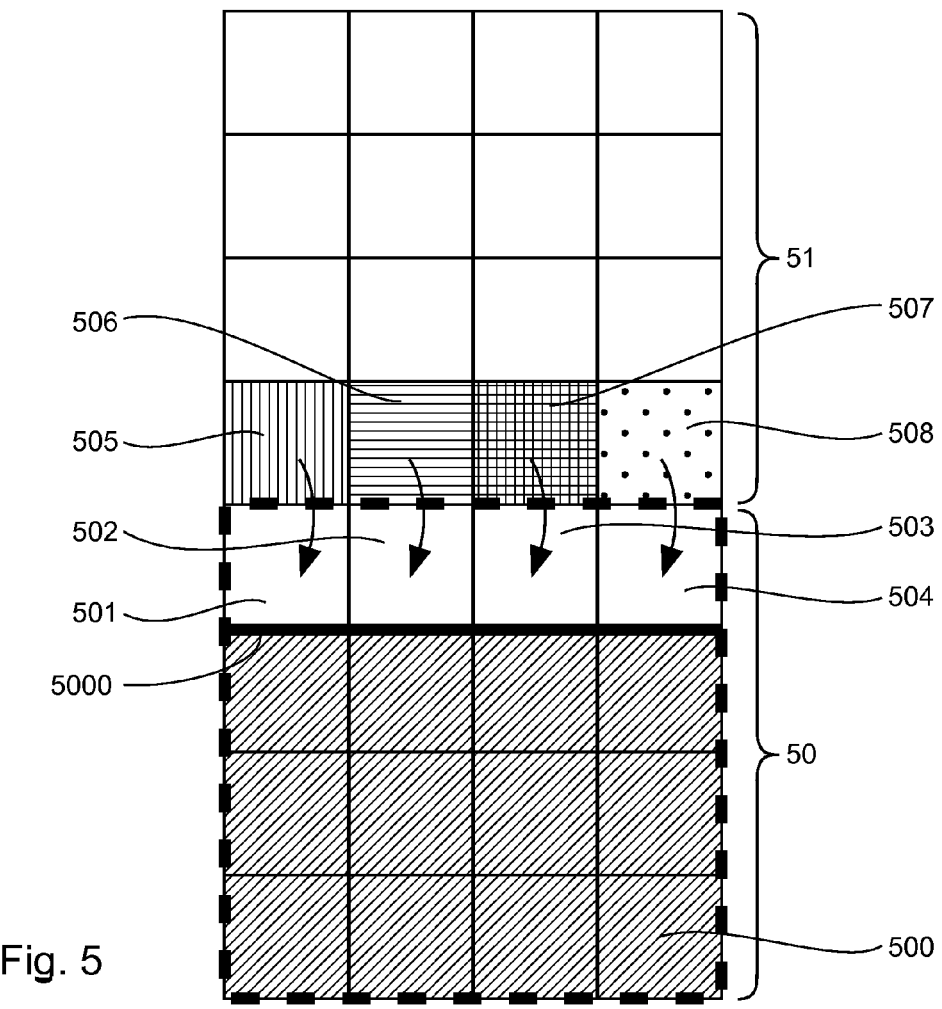
Fig. 4
Fig. 5

METHOD FOR ENCODING AND DECODING IMAGES, ENCODING AND DECODING DEVICES, CORRESPONDING DATA STREAMS AND COMPUTER PROGRAM

CROSS-REFERENCE TO RELATED APPLICATIONS

This Application is a Section 371 National Stage Application of International Application No. PCT/FR2010/051213, filed Jun. 17, 2010, which is incorporated by reference in its entirety and published as WO 2010/149900 on Dec. 29, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the encoding and decoding of images, and especially of video streams constituted by a series of successive images. More specifically the disclosure pertains to the compression of images or image sequences using a representation of images by blocks.

The disclosure can thus be applied especially but not exclusively to video encoding implemented in present-day video encoders and their amendments (MPEG, H.264, H.264 SVC, H.264 MVC, etc.) or to future encoders (ITU-T/VCEG (H.265) or ISO/MPEG (HVC), and to the corresponding decoding.

BACKGROUND OF THE DISCLOSURE

Digital images and image sequences occupy a great deal of memory space, making it necessary when transmitting these images, to compress them in order to avoid problems of congestion in the communication network used for this transmission. Indeed, the bit rate used for this network is generally limited.

There already exist numerous video data compression techniques. Among them, numerous video-encoding techniques, especially the H.264 technique, use techniques for predicting pixels of a current image relatively to other pixels belonging to the same image (intra prediction) or to a previous or following image (inter prediction).

More specifically, according to this H.264 technique, I images are encoded by spatial prediction (intra prediction) and P and B images are encoded by temporal prediction relatively to other I, P or B images (inter prediction) encoded/decoded by means of motion compensation for example.

To this end, the images are sub-divided into macroblocks which are then sub-divided into blocks. A block is constituted by a set of pixels. The pieces of encoding information are then transmitted for each block.

Classically, the encoding of a block is done by means of a prediction of the block and of an encoding of a prediction residue to be added to the prediction. The prediction is done by means of information already rebuilt (preceding blocks already encoded/decoded in the current image, images preliminarily coded in the context of a video encoding, etc).

After this predictive encoding, the blocks of pixels are transformed by a transform of type discrete cosine transform and then quantized. The coefficients of the quantized blocks of pixels are then scanned in a reading order making it possible to exploit the large number of zero coefficients in the high frequencies, and are then encoded by an entropic encoding.

According to the H.264 technique for example, for each block the following are encoded:
- the encoding type (intra prediction, inter prediction, default or skip prediction for which no information is transmitted to the decoder);
- the type of partitioning;
- the information on the prediction (orientation, reference image, etc);
- the motion information if necessary;
- the encoded coefficients corresponding to the transform residue after quantization and entropic encoding;
- etc.

The decoding is done image by image and for each image it is done macroblock by macroblock. For each macroblock, the corresponding elements of the stream are read. The inverse quantification and the inverse transformation of the coefficients of the blocks of the macroblock are done. Then, the prediction of the macroblock is computed and the macroblock is rebuilt by adding the prediction to the decoded prediction residue.

These compressive encoding techniques are efficient but are not optimal for compressing images comprising areas having similar characteristics such as a homogenous texture.

In particular, in the H.264/MPEG-4 AVC standard, the spatial prediction of a block in an image relatively to a block in this same image is possible only if this other block is a neighboring block of the block to be predicted and being located in certain predetermined directions relatively to this one, i.e. generally above and to the left, in a neighborhood known as a "causal" vicinity. Similarly, the prediction of the motion vectors of a block of an image is a causal prediction relatively to the motion vectors of neighboring blocks.

This type of prediction therefore does not make it possible to take advantage of the textural similarity of blocks of disjoined areas with the same texture, or of blocks that are far apart in an area with the same texture. In other words, this type of technique does not enable blocks possessing common characteristics to be addressed simultaneously as a single entity. Moreover, the motion of homogenous texture areas from one image to another is not used optimally either: indeed, the temporal prediction according to the H.264/MPEG-4 AVC standard makes it possible to exploit the motion of a block from one image to another but not the membership of this block in a area having homogenous motion.

To resolve this problem, certain techniques known as regional encoding techniques have proposed to segment the images of a video sequence so as to isolate areas of homogenous motion and texture in these images before encoding them. These areas define objects in these images on which it is chosen for example to use a finer encoding or on the contrary a coarser encoding.

However, these regional encoding techniques make it necessary to send to the encoder that is the destination of the video sequence a segmentation map computed for each image in the encoder which sends this video sequence. This segmentation map is very costly in terms of memory space because the boundaries of this segmentation map generally do not correspond to the boundaries of the blocks of pixels of the segmented images. Furthermore, the segmentation of a video sequence into areas of arbitrary shapes is not deterministic: the boundaries of the segmentation map generally do not correspond to the boundaries of the real objects that this map attempts to sub-divide in the images of the video sequence. Because of this, only the representation and transmission of such segmentation maps have been standardized (MPEG-4 standard part 2), and not their production.

The international patent application n° PCT/FR2009/ 050278 filed on 20 Feb. 2009 on behalf of the present Applicant proposes a video compression technique using "clusters of blocks" making it possible to resolve certain of these drawbacks. More specifically, according to this technique, certain macroblocks of the image sequence are grouped together in clusters when they share a common piece of information, for example a piece of information on motion. The common piece of information is then encoded only once for all the macroblocks of the cluster and, at decoding, the macroblocks belonging to the cluster inherit information on motion from the decoded cluster. This technique enables a gain in compression by preventing the encoding of redundant information.

However, according to this technique, the signaling of clusters in the stream can prove to be costly in terms of bit rate.

Indeed, the clusters may contain any macroblocks of an image or of a group of images.

Furthermore, since certain blocks or sub-blocks of a macroblock may be excluded from a cluster, it is necessary to report, for each macroblock, whether some of its blocks or sub-blocks are excluded.

There is therefore a need for a new image encoding/ decoding technique making it possible to resolve at least certain drawbacks of the prior art and making it possible to optimize the signaling of the data stream and hence the transmission bit rate.

SUMMARY

An exemplary aspect of the disclosure relates to a method for encoding a sequence of at least one image, an image being formed by blocks of pixels grouped together in groups of standard size.

According to an embodiment of the invention, such a method implements the following steps for at least one group of an image of the sequence:
  determining, for each of the blocks of the group, at least one characteristic parameter of the block;
  forming at least one cluster comprising blocks having at least one similar characteristic parameter as a function of the result of the determining step;
  encoding the blocks of the cluster or clusters, delivering for each cluster, pieces of information on cluster encoding, the similar characteristics parameters associated with each of the blocks of a cluster being encoded only once for the cluster;
  encoding blocks of the group that do not belong to any cluster, known as external blocks, delivering for each external block, pieces of information on encoding external blocks, the characteristic parameter or parameters associated with each of the external blocks being not encoded; Such a method also implements the following steps:
    generating a data stream representing the sequence comprising the pieces of information on encoding clusters and the pieces of information on encoding external blocks, and
    inserting, into the data stream, at least one piece of information on partitioning of the group or groups, enabling the identification, within a group, of the external block or blocks.

Thus, an embodiment of the invention relies on a novel and inventive approach to the encoding of images, and proposes a technique according to which data specific to different blocks such as data on texture, color or again motion prediction are pooled between blocks having similar texture, color or again a similar motion prediction vector. In other words, if the difference between two characteristic parameters of a same type, for example between two motion vectors, is below a predetermined threshold, then these two characteristic parameters are considered to be similar.

According to an embodiment of the invention, pieces of data specific to the blocks of a group belonging to zones having similar characteristics, such as texture, color or homogenous motion, are thus pooled very flexibly as compared with the prior-art techniques.

Indeed, the grouping together of blocks of a group having similar characteristics such as homogenous texture within a same cluster makes it possible to include, in this cluster, blocks of a same group that are distant from one another, i.e. that are not neighbors (not in "direct" contact).

An embodiment of the invention also optimizes the quantity of information transmitted and therefore the transmission bit rate.

Indeed, an embodiment of the invention does not necessitate the transmission of segmentation maps to the decoder which is the destination of the encoded image or images.

An embodiment of the invention also minimizes the cost of signaling clusters, as compared with the technique described in the international patent application n° PCT/ FR2009/050278 mentioned here above.

In particular, the fact of building clusters within blocks of pixels grouped together in standard-sized groups regularizes the cluster-forming intervals, where one or more clusters can be formed within a same group. For example, according to one preferred embodiment of the invention, a standard-sized group is a square-sized group comprising eight blocks of pixels per column and eight blocks of pixels per row. Thus, it may be considered that the cluster will always be built within a group of 8×8 blocks of pixels.

These groups can be formed spatially within an image or temporally in the image sequence.

Furthermore, according to an embodiment of the invention, a piece of information on partitioning is inserted into the data stream making it possible to identify within a group, the external block or blocks that do not belong to any cluster.

This piece of information on partitioning makes it possible to set up a "boundary" in a group of blocks-between the blocks allocated to a cluster of external blocks that do not have any similar characteristic parameter with the blocks of the cluster. Besides, if a group comprises several clusters, the "boundary" adapts to the outlines of the clusters, for example a broken line, making it possible to separate external blocks from blocks belonging to a cluster.

Furthermore, it is possible that a same block belongs to two distinct clusters, one being built for example from a characteristic parameter of motion vector type and the other from a characteristic parameter of prediction residue type.

Thus, it is possible to transmit only one piece of information on partitioning per group to signal the blocks external to the clusters within a group, whereas in the prior art described in the international patent application No. PCT/FR2009/050278 mentioned here above, it is necessary, for each macroblock, to report whether certain of its blocks or sub-blocks are excluded.

Finally, the similar characteristic parameter justifying the construction of a cluster is not encoded for the external blocks, which represents non-negligible gain in terms of signaling.

According to one particular embodiment of the invention, the external blocks of a group form at least one row and/or at least one column of the group.

In this way, all the blocks of a same row or of a same column are excluded.

The method for encoding according to an embodiment of the invention, thus makes it possible to limit the cost of signaling and/or encoding, and/or makes it possible to improve processing speed because within a group, if one block is external, then the row and/or the column to which the external block belongs will also be external.

According to one particular embodiment, the piece of information on partitioning of a group is representative of either:

a vertical partitioning of the group defined from a vertical shift, in terms of number of pixels or blocks relatively to the first pixel or block of the group according to a predetermined scanning order;

or of a horizontal partitioning of the group defined from a horizontal shift in terms of number of pixels or blocks relatively to the first pixel or block of the group according to a predetermined scanning order;

or of a diagonal partitioning of the group defined from a vertical and/or horizontal shift in terms of number of pixels or blocks relatively to the first pixel or block of the group according to a predetermined scanning order, and an angle of tilt relatively to a vertical or horizontal axis of the group.

Thus, the method for encoding according to an embodiment of the invention makes it possible to define a "boundary" within a group separating the external blocks from the blocks of the group belonging to at least one cluster. This "boundary" can be vertical (the external blocks of a group then form at least one column), horizontal (the external blocks of a group then form at least one row) or diagonal within the group, depending on the nature of the shift of which the partitioning information is representative.

For example, in one embodiment implementing a "diagonal boundary", the blocks having a similar characteristic parameter belong to a same cluster whose boundary forms a broken line or again a "staircase" within the group. The piece of partitioning information corresponding to this broken line will be encoded in the form of a diagonal straight line going through the blocks forming the "stairs of the staircase".

At decoding, for a group containing only one cluster, the decoder will be able, for example, to decode the piece of partitioning information representing the diagonal boundary and will consider that block crossed by the diagonal straight line belongs to the cluster if this block has a majority of pixels situated on the side of the cluster relatively to the diagonal straight line or is an external block if this block has a majority of pixels situated on the other side of the cluster relatively to the diagonal straight line.

According to another example implementing a "diagonal boundary", the first and last block of the diagonal may be external blocks belonging to no cluster. This option increases the gain in signaling, in forming at least one entire column and/or row of external blocks in the group. A partitioning rule of this kind will be known to the decoder.

According to one particular embodiment of the invention, the characteristic parameter belongs to the group comprising:

a value of type of prediction encoding, for example intra prediction, inter prediction, default or skip prediction;

a motion vector value;

a zero prediction residue value, in other words a "perfect" prediction;

a value of type of transformation (transformation performed on blocks of 4×4 pixels, 8×8 pixels, 16×16 pixels etc, oriented transformation, etc);

a value of a coefficient of illumination compensation (coefficients applied to the prediction coming from the motion compensation of a *P+b type with a being a weighting coefficient, b being a shift coefficient and P being the value of the prediction);

a value of a coefficient of weighting of different predictions;

etc.

It is possible in this way to pool and reduce the signaling cost, very flexibly as compared with the prior-art techniques.

The value of the characteristic parameter associated with a block of a cluster may for example correspond to a value of motion vector between a block of the cluster of a current image and a block of a reference image.

Furthermore, as the case may be, when a cluster allows it, the encoding method determines several similar characteristic parameters for the set of blocks constituting the cluster. In this case, this plurality of parameters is encoded for the cluster.

For example, if two blocks of a same group have a similar value of direction of prediction, and a similar motion vector value, then the cluster formed by these two blocks comprises blocks having two similar characteristic parameters. According to another example, a cluster groups together blocks having the same motion parameters, namely the motion vector or vectors, the image indices used for motion compensation in the list of images, the direction of prediction of the motion vector, the prediction residue of the motion vector. In the particular case where the prediction mode designates two motion vectors, the blocks of the cluster can also have in common weighting coefficients of these vectors.

It can be noted that the value of the characteristic parameter associated with a cluster may correspond to the value of a characteristic parameter associated with a block of the cluster.

According to another example, the value of the characteristic parameter associated with a cluster may correspond to a median value of the similar characteristic parameters associated with each block of the cluster, or again a rounded-off value of a characteristic parameter of a block of the cluster. For example, if several blocks of a group have similar motion vectors with a distance below a predetermined threshold (for example 0.0005), then these blocks may be grouped together in a same cluster and the value of the characteristic parameter associated with the cluster may correspond to the average of the values of the motion vectors of each block of the cluster.

Another embodiment of the invention pertains to a method for decoding a data stream representing a sequence of at least one image, an image being formed by blocks of pixels grouped together in standard-sized groups.

According to an embodiment of the invention, such a decoding method implements the following steps for at least one group of blocks encoded in the data stream:

extracting at least one piece of information on partitioning of the group, present in the data stream, making it possible to identify, within the group of blocks known as external blocks, an external block belonging to no cluster of the group, a cluster being formed by blocks of the group having at least one similar characteristic parameter;

decoding of the blocks of at least one cluster of the group from pieces of information on encoding clusters present in the data stream, comprising:
- a step for decoding a block of the cluster implementing a decoding of the characteristic parameter or parameters encoded only once for the cluster;
- a step for decoding other blocks of the cluster taking account of the previously decoded characteristic parameter or parameters;

decoding of the external blocks from pieces of external block encoding information present in the data stream, taking account of at least one characteristic parameter of the previously decoded neighboring blocks.

Thus, the decoding technique of an embodiment of the invention makes it possible, at the reception and reading of encoding and partitioning information, to decode the different groups and rebuild the sequence of images.

As already indicated in relation with the encoding, the information on partitioning associated with the group make it possible especially to determine the "boundary" between the blocks of the cluster or clusters of the external blocks, within a same group.

Besides, according to an embodiment of the invention, the characteristic parameter associated with each of the external blocks is determined as a function of that of the previously decoded neighboring blocks. In other words, this parameter will be obtained by inheriting previously decoded neighboring blocks. It will therefore be understood that this inheritance mechanism forms new clusters, the "boundaries" of which extend beyond the group, within the sequence of images without having necessitated any additional signaling.

A decoding method of this kind is especially adapted to decode a data stream encoded according to the encoding method described here above. It could of course comprise the different characteristics pertaining to the encoding method according to an embodiment of the invention.

According to one embodiment of the invention, the decoding method is such that, for a group of blocks considered:
- when the piece of information on partitioning represents a vertical partitioning, the characteristic parameter associated with an external block takes the value of the characteristic parameter associated with the neighboring block situated directly to the left of the external block;
- when the piece of information on partitioning represents the horizontal partitioning, the characteristic parameter associated with an external block takes the value of the characteristic parameter associated with the neighboring block situated directly above the external block;
- when the piece of information on partitioning represents a diagonal partitioning, the characteristic parameter associated with an external block is equal to a combination of the values of the characteristic parameters associated with the neighboring blocks situated to the left and/or above and/or at the top left of the external block according to the position of the diagonal partitioning line in the group of blocks considered.

In this way, depending on the nature of the "boundary", whether vertical, horizontal or diagonal, a "external" block within the group inherits respectively the characteristic parameter from the previously decoded neighboring block situated directly to the left, above or to the top left.

Another embodiment of the invention pertains to a data stream representing a sequence of at least one image, an image being formed by blocks of pixels grouped together in standard-sized groups.

According to an embodiment of the invention, such a data stream carries:
- a piece of information on partitioning of at least one group of an image of the sequence enabling the identification, within the group of the blocks known as external blocks, of an external block that belongs to no cluster, a cluster being formed by blocks of the group having at least one similar characteristic parameter;
- pieces of information on cluster encoding obtained for at least one group during the encoding of the blocks of at least one cluster, at least one similar characteristic parameter associated with each of the blocks of a cluster being encoded only once for the cluster; and
- pieces of information on external block encoding, obtained for at least one group during the encoding of external blocks of the group, at least one characteristic parameter associated with each of the external blocks being not encoded.

A data stream of this kind can especially be sent out by the encoding method described here above. This data stream could of course comprise different characteristics pertaining to the method for encoding according to an embodiment of the invention.

In another embodiment, the invention pertains to a device for encoding a sequence of at least one image, an image being formed by blocks of pixels grouped together in standard-sized groups.

According to an embodiment of the invention, such an encoding device comprises the following means activated for at least one group of the image of the sequence:
- means for determining, for each of the blocks of the group, at least one characteristic parameter of the block;
- means for forming at least one cluster comprising the blocks having at least one similar characteristic parameter, as a function of the result of the determining means;
- means for encoding the blocks of the cluster or clusters delivering, for each cluster, pieces of information on cluster encoding, the similar characteristic parameters associated with each of the blocks of a cluster being encoded only once for the cluster;
- means for encoding the blocks of the group that do not belong to any cluster known as external blocks delivering, for each external block, pieces of information on encoding external blocks, the similar characteristic parameter or parameters associated with each of the external blocks being not encoded;

and in that the device also comprises:
- means for generating a data stream representing the sequence comprising pieces of information on encoding clusters and pieces of information on encoding external blocks, and
- means for inserting, into the data stream, at least one piece of information on partitioning of the group or groups, enabling the identification, within a group, of the external block or blocks.

An encoding device of this kind is adapted especially to implement the encoding method described here above. It is for example an MPEG or H.264 type encoder or an encoder according to a future encoding standard.

In another embodiment, the invention pertains to a device for decoding a stream of data representing a sequence of at least one image, an image being formed by blocks of pixels grouped together in standard-sized groups.

According to an embodiment of the invention, a decoding device of this kind comprises the following means, activated for at least one group of encoded blocks in the data stream:

means for extracting at least one piece of information on partitioning of the group, present in the data stream, making it possible to identify, within the group of blocks known as external blocks, an external block belonging to no cluster, a cluster being formed by blocks of the group having at least one similar characteristic parameter;

means for decoding the blocks of at least one cluster of the group from pieces of information for encoding clusters present in the data stream, comprising:

means for decoding a block of the cluster implementing a decoding of the characteristic parameter or parameters encoded only once for the cluster;

means for decoding other blocks of the cluster taking account of the previously decoded characteristic parameter or parameters;

means for decoding the external blocks from pieces of external block encoding information present in the data stream, taking account of at least one characteristic parameter of the previously decoded neighboring blocks.

A decoding device of this kind is adapted especially to implement the decoding method described here above. It is for example an MPEG or H.264 type decoder or a decoder according to a future standard.

Another embodiment of the invention concerns at least one computer program comprising instructions to implement the encoding method as described here above and/or the decoding method as described here above when the program or programs is/are executed by a processor.

It can be noted indeed that the encoding method, like the decoding method, can be implemented in various ways, especially in wired form or in software form.

BRIEF DESCRIPTION OF THE DRAWINGS

Other characteristics and advantages shall appear more clearly from the following description of a particular embodiment given by way of a simple illustratory and non-exhaustive example and from the appended figures, of which:

FIG. 4 describes the structure of a data stream generated according to one embodiment of the invention;

FIG. 5 presents the decoding of a group of blocks using a horizontal partitioning;

DETAILED DESCRIPTION OF ILLUSTRATIVE EMBODIMENTS

1. General Principle

The general principle of an embodiment of the invention relies on the building of one or more clusters of blocks within at least one group of standard-sized blocks. Such clusters are built by grouping together the blocks having a similar characteristic parameter within a same group. In this way, the blocks of the group that do not have a characteristic parameter similar to those of another block are "excluded". These blocks of the group which do not belong therefore to any cluster are called external blocks.

Thus, the term "group" according to an embodiment of the invention is applied to a set of blocks of predefined size, square or rectangular, such as 4×4 blocks, 8×8 blocks or 8×4 blocks etc. A cluster corresponds to a subset of blocks of this group, comprising the blocks having at least one similar or proximate characteristic parameter. A group may comprise zero, one or more clusters. A block may belong to several clusters. For example, a first block of the group having characteristic parameter of a motion vector type equal to mv1 and a characteristic parameter of prediction residue type equal to zero, a second block of the same group having a characteristic parameter of motion vector type substantially equal to mv1, and a third block of the same group having a characteristic parameter of prediction residue type equal to zero. The first and second blocks then form a first cluster associated with the characteristic parameter of motion vector type equal to mv1 and the first and third blocks form a second cluster associated with the characteristic parameter of prediction residue type equal to zero.

The technique of an embodiment of the invention also makes it possible to generate a data stream which, inter alia, carries at least one piece of information on partitioning defining the "boundary" separating the blocks of a group belonging to clusters from blocks external to this same group. The characteristic parameter associated with the blocks of a same cluster is encoded only once for the cluster, and the characteristic parameter associated with each of the external blocks is advantageously not encoded, thus giving a signaling gain.

Finally, on the decoding side, this information on partitioning is used to identify the external blocks of a group. The decoding of an external block thus identified is especially done by inheriting the characteristic parameter of one of the previously decoded neighboring blocks.

2. Description of Embodiments of the Encoding Method

Here below, we describe the working of an embodiment of the invention on the encoding side.

Figure 1A:
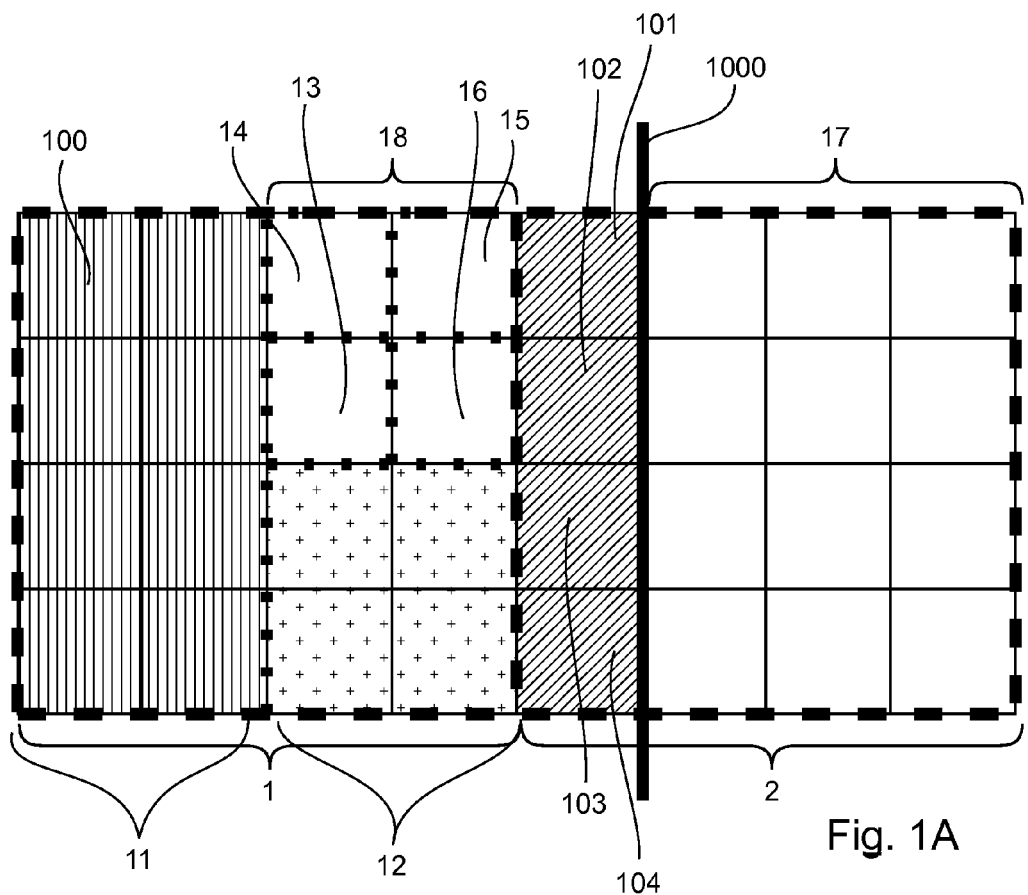
FIGS. 1A and 1B present groups of blocks encoded according to one embodiment of the invention in using respectively a vertical partitioning and a diagonal partitioning.
Figure 1B:
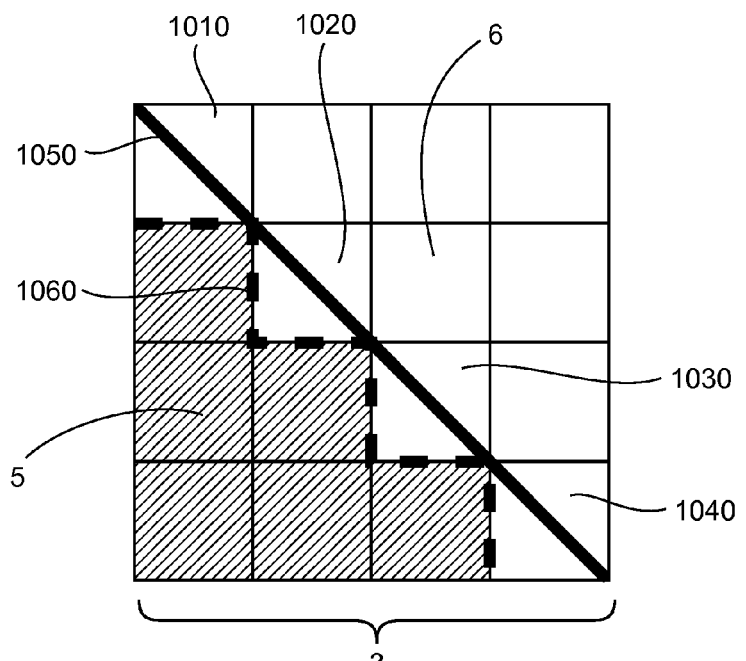

More specifically, FIGS. 1A and 1B illustrate groups of blocks which are to be encoded according to one embodiment of the invention.

This embodiment is situated in the case where the groups are defined regularly in each image of the sequence and have a standard size of 4×4 blocks of 8×8 pixels for example. For at least one group of blocks (referenced 1, 2 or 3), for each of the sixteen blocks of this group, the value of at least one characteristic parameter of this block (for example a value of prediction direction and/or a motion vector value associated with this block) is or are determined.

Depending on these parameters, the blocks are then grouped within a same group to form clusters. It may be recalled that a cluster is formed by blocks of a group having similar characteristic parameters.

For example, FIG. 1A illustrates two groups referenced 1 and 2.

The group 1 of FIG. 1A situated to the left in the figure, gives a good explanation of the notion of a cluster. Following the step for determining characteristic parameters associated with each block, the blocks of the first group 1 are grouped together in three clusters 11 (corresponding to the first two columns of the first group 1), 12 (corresponding to the last two rows and last two columns of the first group 1) and 18 (corresponding to two first rows and two last columns of the first group 1, i.e. to the blocks 13 to 16). For example, the blocks of the first cluster 11 each carry a motion vector substantially equal to mv6, the blocks of the second cluster 12 each carry a motion vector substantially equal to mv4, the blocks of the third cluster 18 each carry a motion vector substantially equal to mv3.

According to an embodiment of the invention, the blocks of each cluster are encoded, delivering information on encoding clusters for each cluster. By contrast, the motion vector is encoded only once for each cluster. This characteristic parameter can be encoded with the blocks, in the information on encoding clusters, or "outside" the information on encoding clusters.

For example, the motion vector mv6 is encoded only once for the eight blocks forming the first cluster 11, the motion vector mv4 is encoded only once for the four blocks forming the second cluster 12 and the motion vector mv3 is encoded only once for the four blocks forming the third cluster 18. The value of the characteristic parameter of the first group 11 corresponds for example to the motion vector of the block 100. In other words, the characteristic parameter (motion vector mv6) is encoded for the block 100, which is the first block of the cluster 11 in a predetermined order of scanning of the group, and is no longer encoded for the other blocks of the cluster. According to one alternative, if the motion vectors of certain blocks of a group are sufficiently proximate, justifying their being grouped together in clusters, the value of the characteristic parameter associated with the cluster can be equal to an average of the motion vectors of the blocks constituting the cluster.

It can be noted that the group 1 does not comprise any external block according to an embodiment of the invention. In this case, it is not necessary to transmit partitioning information.

The group 2 of FIG. 1A illustrates the case where a group comprises at least one cluster and external blocks. More specifically, following the step for determining characteristic parameters associated with each block, certain blocks of the second group 2, situated to the right in the figure, are grouped together in a cluster 17 formed by the three last columns of the group 2. The other blocks of the group 2, forming the first column of the group, correspond to external blocks which do not have any characteristic parameters similar to those of the blocks of the cluster 17.

As illustrated in FIG. 1A, the second group 2 has a "boundary" corresponding to a vertical partitioning of the second group 2. This partitioning is used to identify the external blocks 101, 102, 103 and 104 of the second group 2 situated to left of the boundary line 1000.

According to an embodiment of the invention, these blocks 101 to 104 are reported as being external blocks through a piece of information on partitioning of the group 2 and their characteristic parameter (their motion vector for example) is not encoded. The "non-encoding" of this column of external blocks makes it possible to obtain efficient encoding gain.

The blocks of the second group 2 situated to the right of the boundary line 1000 will inherit, from the decoding, of the characteristic parameter (motion vector mv2 for example) associated with the cluster 17. The external blocks 101 to 104, situated to the left of the boundary line 1000, will inherit, from the decoding, the characteristic parameter associated with their previously encoded/decoded neighboring block or blocks. For example, as described here below with reference to the decoding, the blocks 101 to 104 will inherit a neighboring block situated to the left, for example the block 101 will inherit from the motion vector from the block 15, the block 102 will inherit the motion vector from the block 16 etc.

Depending on the encoding scheme used, a prediction residue will be computed or not for each of these external blocks and then, as the case may be, transmitted in the data stream.

To signal this partitioning of the group to the decoder, a piece of information on partitioning is inserted and encoded in a data stream representing the sequence of images. For example, it is possible to encode a vertical shift relatively to the origin of the group of blocks to indicate the distance from the partitioning line at the origin of the group. For example, in FIG. 1A, the vertical shift is equal to one block relatively to the origin of the second group 2, i.e. relatively to the first block (101) of the second group 2.

At decoding, the decoder can decode the partitioning information representing the boundary and deduce therefrom a value of the "non-encoded" characteristic parameter as described here below.

Thus, whether the group carries one or more clusters or no cluster at all is signaled in the stream. If the group has one cluster, all the blocks of the cluster inherit, from the decoding, the value of the parameters carried by the cluster.

Thus, a signaling is obtained of the groups at two levels. The first signaling level is fixed and corresponds to the sub-division of the image into standard-sized groups, within which there may be a formation of clusters. The second level enables the partitioning of the group into clusters to adapt it to the characteristics of the image and to encode, only once per cluster, a similar characteristic parameter for the different blocks forming the cluster.

This signaling of the group at two levels is less costly while at the same time it remains adaptive.

The example of the second group 2 of FIG. 1A shows a vertical partitioning of the cluster.

Naturally, other partitionings can be envisaged especially a horizontal partitioning or else a diagonal partitioning of the group.

FIG. 1B illustrates another example of a group referenced 3. The group 3 of FIG. 1B is partitioned in a diagonal partitioning. The boundary straight line 1050 for partitioning the group 3 or more strictly a broken line 1060 shown in FIG. 1B demarcates a cluster, referenced 6, relatively to a set of external blocks referenced 5.

Indeed, according to the embodiment shown, we consider blocks having a similar characteristic parameter belonging to a same cluster 6, the boundary of which rigorously forms a broken line 1060 or again a "staircase" line within the group. The information on partitioning corresponding to this broken line 1060 will be encoded in the form of a diagonal straight line going through the blocks forming the "staircase steps". Thus, the blocks 1010, 1020, 1030, 1040 belonging to the cluster 6 are each characterized by a majority of pixels situated on the "side" of the cluster 6 to the right of the diagonal straight line 1050.

When decoding, the decoder could decode, for example for the group 3 containing the cluster 6, the piece of information on partitioning representing the diagonal boundary and will consider that a block crossed by the diagonal straight line 1050 belongs to the cluster 6 if this block has a majority of pixels situated on the cluster 6 side relatively to the diagonal straight line 1050, or is an external block if this block has a majority of pixels situated on the side opposite to the cluster 6 relatively to the diagonal straight line 1050.

According to another embodiment, a rule may be considered that emphasizes a formation of clusters of blocks, such that the blocks external to this cluster form at least one column and/or at least one row of external blocks. Thus, the block 1010 and the block 1040 do not belong to the cluster 6 and belong to a column or a row of external blocks. The blocks 1020 and 1030 are furthermore attached to the cluster 6. A partitioning rule of this kind will be known to the decoder.

In this particular case, namely the case of diagonal partitioning, it is possible for example to encode a piece of information on partitioning representing a vertical shift and an angle of tilt relatively to the horizontal.

According to another particular embodiment, which is non-optimal as understood in the invention, at least one group of the image to be encoded may be encoded according to a prior-art technique. In this case, at least one group of the image to be encoded is such that the characteristic parameter associated with the block not belonging to any cluster of this group is encoded.

Figure 2:
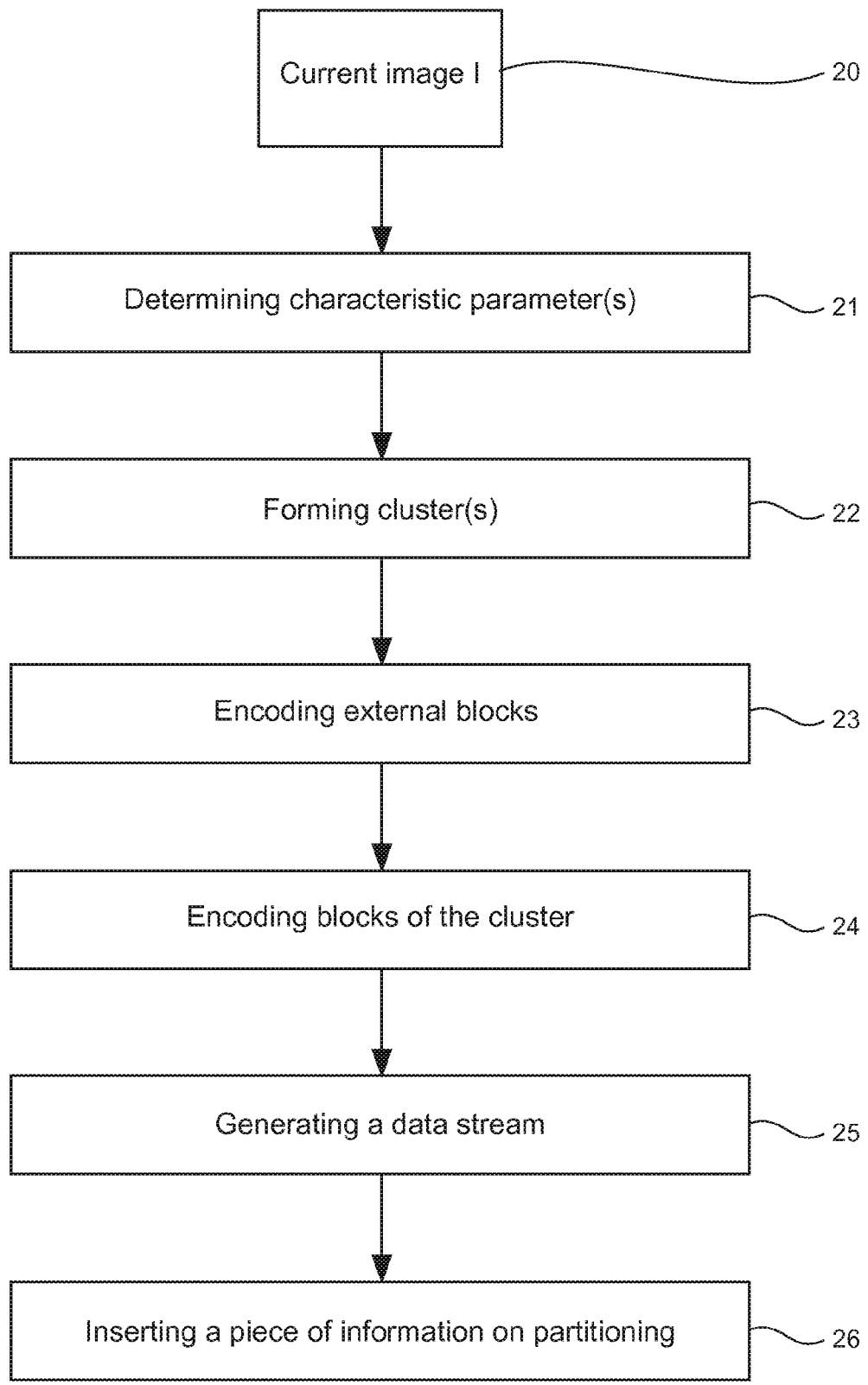
FIG. 2 presents the main steps of the encoding method according to one particular embodiment of the invention.

FIG. 2 more precisely illustrates the different steps implemented during the encoding of a sequence of images, according to one particular embodiment of the invention.

More specifically, we consider a current image 20, pre-subdivided into standard-sized groups, for example groups of 4×4 blocks of 8×8 pixels, as shown in FIGS. 1A and 1B.

The method of encoding implements the following steps for at least one group of the current image 20, for example the second group 2 illustrated in FIG. 1A.

First of all, for each block of this group 2, a characteristic parameter of this block is determined 21. It is for example a motion vector associated with this block.

Then, clusters are formed 22 in the group 2, in seeking to group together blocks having a characteristic similar parameter. For example, blocks having a motion vector substantially equal to mv2 are grouped together and a single cluster 17, illustrated in FIG. 1A, is obtained. The other blocks of the group 2, which do not have any similar characteristic parameter, are external blocks.

Returning to the embodiment as shown in FIG. 1A for example, the external blocks 101 to 104 of the group 2 that do not belong to the cluster 17 are encoded 23, delivering information on encoding of external blocks. It can be noted, that according to an embodiment of the invention, the characteristic parameter (for example the motion vector) associated with each of these four blocks is not encoded.

Then, the encoding 24 of the blocks of the clusters 17, delivering information on encoding clusters, is done. It must be noted that, according to an embodiment of the invention, since the twelve blocks of the cluster 17 have a motion vector substantially equal to mv2, this characteristic parameter is encoded only once for the entire cluster 17.

The order of encoding of the clusters or external blocks of a group can change according to the order of scanning of the blocks in the group. Thus, if the first blocks encountered are external blocks, these external blocks are encoded and then a cluster is encoded when a block belonging to a cluster is encountered. If first of all a block belonging to a cluster is encountered, then the blocks of the cluster are encoded first and then the operation passes to the next non-encoded block in the order of scanning of the blocks. If this block belongs to a new cluster, all the blocks belonging to this new cluster are encoded. If this block is an external block, it is encoded "individually" and so on and so forth until all the blocks of the group have been scanned.

Then, a data stream is generated 25, carrying at least one data structure representing the second group 2. This data structure comprises pieces of information on encoding clusters corresponding to the encoding of the cluster 17 and information for encoding blocks external to this cluster, corresponding to the encoding of the blocks 101 to 104 coming from the previous stages 23 and 24.

Finally, the method inserts 26 into the stream, or into the data structure associated with the group 2, a piece of information on partitioning corresponding to the vertical boundary line 1000 enabling the identification of the external blocks 101 to 104 within the group 2.

Referring to FIG. 4, we present an example of a data stream 4000 obtained during the implementation of the encoding method according to one embodiment of the invention.

In this example, each group of blocks of pixels of an image belonging to an image sequence is encoded in this stream 4000 in the form of a data structure 40. This data structure 40 representing a group of blocks of pixels (for example the group 2 of FIG. 1A) contains a piece of information on partitioning 41 comprising a field 42 indicating the nature of the partitioning (vertical, horizontal, diagonal), a field 43 indicating the shift making it possible to situate the boundary line in the group, a field 44 indicating the tilt of the boundary line. Furthermore, this data structure also contains information on encoding of external blocks 60 proper to the external blocks (for example the blocks 101 to 104 of the group 2 of FIG. 1A) as well as information on encoding clusters 70 pertaining to the blocks belonging to one or more clusters of a group (for example the cluster 17 of the group 2 of FIG. 1A). It may be recalled that these pieces of information on encoding clusters 70 comprise at least one characteristic similar parameter associated with the cluster, encoded only once for the entire cluster.

In the particular case where the cluster is associated with several characteristic parameters, the piece of partitioning information inserted into the data stream also represents the number of characteristic parameters encoded for the cluster. For example, the piece of information on partitioning of a group of blocks indicates a cluster built on the basis of two similar characteristic parameters: a motion vector and the indices of the images used for the motion compensation.

It may be recalled that the partitioning is encoded only once for the group, in the form of a piece of information on partitioning.

Furthermore, in this particular case, the pieces of information on encoding of the blocks external to the cluster indicate that certain blocks are external because they do not have the same motion vector while others are external because they do not have the same indices of the images used for the motion compensation.

Furthermore, in this particular case where the cluster is associated with several distinct characteristic parameters, an embodiment of the invention can associate, with each characteristic parameter, a piece of priority data to specify an order of decoding of the data associated with the clusters to the decoder.

3. Description of Embodiments of the Decoding Method

Figure 3:
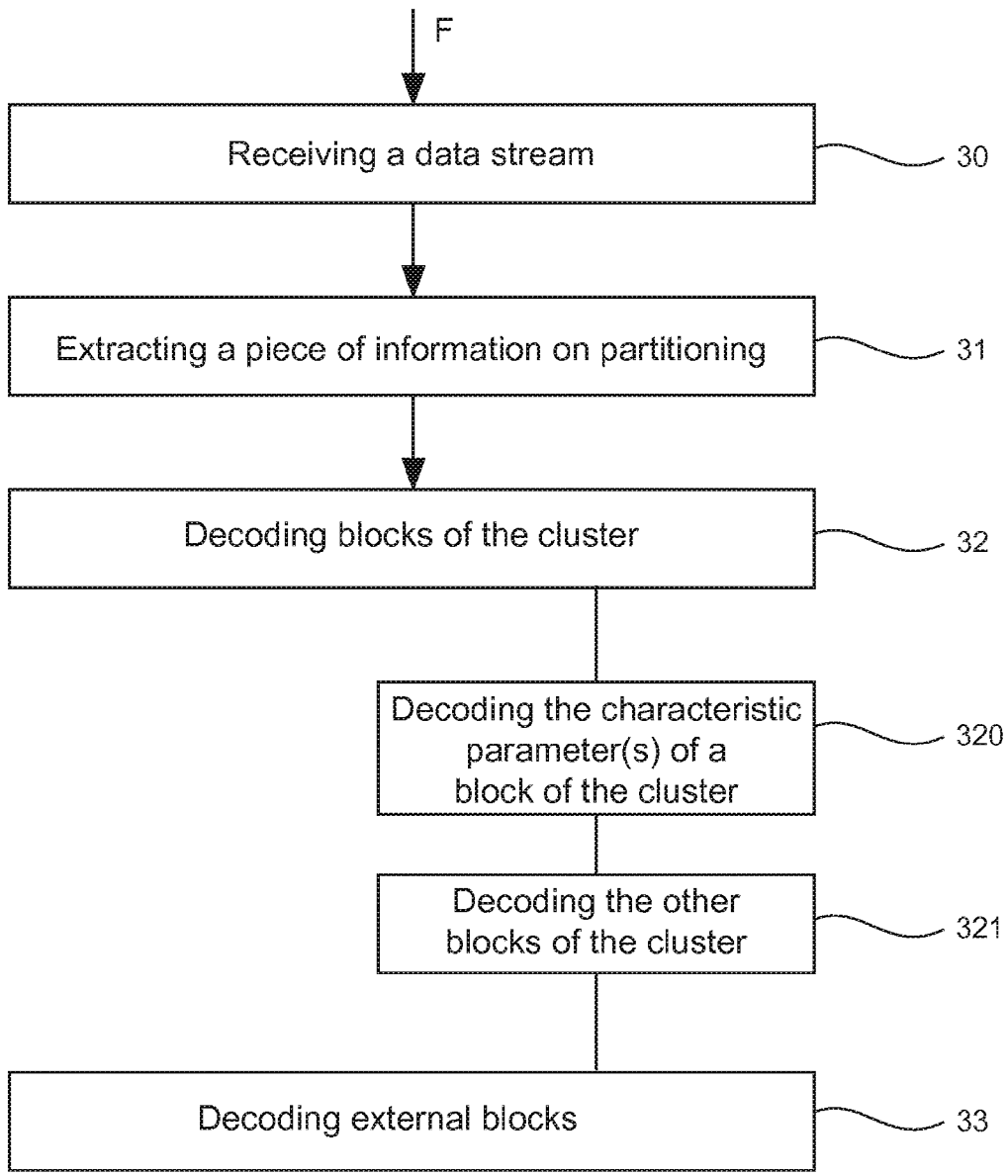
FIG. 3 illustrates the main steps of the decoding method according to one particular embodiment of the invention.

Referring to FIG. 3, we present the main steps of the decoding method according to one embodiment of the invention.

First of all, the decoder receives 30 a stream F representing an image sequence, for example the stream 4000 described with reference to FIG. 4.

For at least one data structure representing a group of blocks of pixels, the method implements the following steps.

It implements an extraction 31 of a piece of information on partitioning of the group of blocks of pixels encoded in the data structure. This extraction step is used to identify, within the group, the presence of one or more clusters and external blocks that do not belong to any cluster of the group being decoded. For reasons of clarity, we shall consider herein the case of a group comprising a single cluster in the group being decoded. Naturally, those skilled in the art will easily extend this teaching to a group having several clusters in a same group.

The decoder is thus able to redraw the boundary line of the group, separating clusters and external blocks, by reading the partitioning information. As described with reference to FIG. 4, this piece of information on partitioning 41 comprises for example a piece of information on the nature, shift and tilt of the boundary line.

Then, the decoder carries out the decoding 32 of the blocks of the cluster of the group.

This decoding comprises two substeps 320 and 321:
the first substep 320 enables the decoding, for a block of the cluster (for example the first according to a predetermined order of scanning of decoding), of the characteristic parameter of the cluster. It may be recalled that this characteristic parameter has been encoded only once for the entire cluster;
the second decoding substep 321 enables the decoding of the other blocks of the cluster, in taking account of the previously decoded characteristic parameter. In other words, the other blocks of the cluster inherit.

Finally, the decoder carries out the decoding 33 of the blocks external to the cluster, in taking account of at least one characteristic parameter of the previously decoded neighboring blocks.

In particular, this decoding takes account of the boundary line which for example can be vertical, horizontal or diagonal. Thus, according to one embodiment of the invention:
when the information on partitioning represents a vertical partitioning, the characteristic parameter associated with an external block takes the value of the characteristic parameter associated with the neighboring block situated directly to the left of the external block;
when the piece of partitioning information represents a horizontal partitioning, the characteristic parameter associated with an external block takes the value of the characteristic parameter associated with the neighboring block situated directly above the external block;
when the piece of partitioning information represents a diagonal partitioning, the characteristic parameter associated with an external block is equal to a combination of the values of the characteristic parameters associated with the neighboring block situated to the left and/or above and/or to the top left of the external block.

Referring to FIG. 5, we present another example of the decoding of the external blocks of a group of blocks, partitioned according to a horizontal partitioning 5000. FIG. 5 presents two groups 51 and 50, the group 51 having been decoded previously. The horizontal boundary line 5000 indicates a horizontal partitioning of the group of blocks 50. This boundary indeed separates a cluster 500, whose characteristic parameter is a motion vector mv7, from the external blocks 501 to 504.

According to one embodiment of the invention, the decoder assigns the external block 501 a motion vector mv8 associated with the neighboring block 505 of the group 51, situated above the block 501 of the group 50. Identically, it assigns the blocks 502, 503, 504 respectively the motion vectors mv9, mv10, mv11 of the blocks 506, 507, 508 situated above these blocks.

Depending on the encoding scheme used, the decoder carries out a motion compensation by means of the motion vector assigned to the external block and adds, to the values predicted for the external block, a possible prediction residue received in the data stream.

According to one alternative embodiment, for example, a linear combination (for example an average) of the motion vectors of the blocks 505, 506 and 507, situated to the top left, above and to the top right of the external block 502 is assigned to the external block 502.

It is thus possible to form new clusters, to extend clusters of previously decoded groups. For example, the blocks 505 and 501 form a new cluster having the motion vector mv8 as its characteristic parameter.

In the particular case where a cluster is associated with several characteristic parameters, the extraction step described here above furthermore makes it possible to identify the different characteristic parameters associated with said cluster. Then, the decoding method of an embodiment of the invention reiterates the steps for decoding the blocks of the cluster and for decoding blocks external to the cluster for each of the characteristic parameters identified.

Furthermore, the particular case of a piece of information on partitioning representing a diagonal partitioning, the decoder could decode, for example for a group containing a single cluster, the piece of partitioning information representing the diagonal boundary, and could assign a block crossed by the diagonal line to a cluster if this cluster has a majority of pixels situated beside the cluster relatively to the diagonal boundary line.

4. Structure of the Encoding and Decoding Devices

Figure 6:
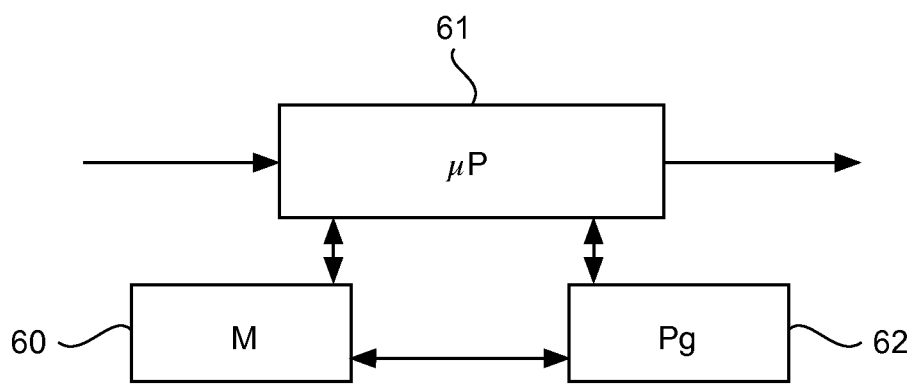
FIGS. 6 and 7 respectively present the structure of an encoding device and a decoding device according to one particular embodiment of the invention.
Figure 7:
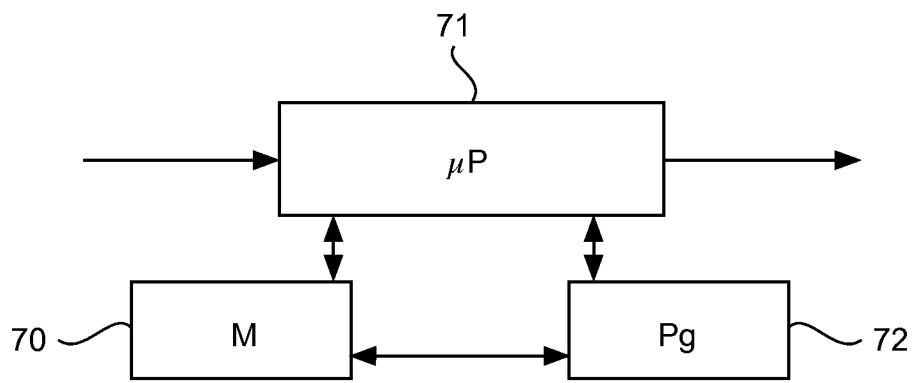

Referring now to FIGS. 6 and 7, we present the simplified structure of an encoding and decoding device according to the embodiments described here above.

As illustrated in FIG. 6, an encoding device of this kind comprises a memory 61 comprising a buffer memory, a processing unit 62, equipped for example with a microprocessor μP and driven by the computer program 63 implementing the method for encoding according to an embodiment of the invention.

At initialization, the computer program code instructions 63 are for example loaded into a RAM and then executed by the processor of the processing unit 42. The processing unit 62 inputs a sequence of at least one image. The microprocessor of the processing unit 62 implements the steps of the encoding method described here above, according to the instructions of the computer program 63, to encode the sequence of images. To this end, the encoding device comprises, in addition to the buffer memory 61, means for determining, for each of the blocks of at least one group of an image, at least one characteristic parameter of the block, means for forming at least one cluster comprising blocks having at least one similar characteristic parameter, means for encoding blocks of the cluster or clusters, means for encoding blocks of the external group that do not belong to any cluster, means for generating a data stream representing a sequence, and means for the insertion into the data stream of at least one piece of information on partitioning of the group or groups. These means are driven by the microprocessor of the processing unit 62. The processing unit 62 therefore transmits, to at least one encoding device, a data stream representing the image sequence comprising information on partitioning, cluster encoding and encoding of external blocks.

As illustrated in FIG. 7, a device for decoding of this type for its part comprises a memory 71 comprising a buffer memory, a processing unit 72 equipped for example with a processor μP and driven by the computer program 73 implementing the method for decoding according to an embodiment of the invention.

At initialization, the code instructions of the computer program 73 are for example loaded into a RAM and then executed by the processor of the processing unit 72. The processing unit 72 inputs a data stream representing the sequence of images, comprising information on partitioning, cluster encoding, and encoding of external blocks. The microprocessor of the processing unit 72 implements the steps of the decoding method described here above according to the instructions of the computer program 73 to decode the encoded blocks. To this end, the decoding device comprises, in addition to the buffer memory 71, means for extracting at least one piece of information on partitioning of the group, means for decoding blocks of one cluster of the group on the basis of information on encoding clusters present in the data stream and means for decoding external blocks from external block encoding information present in the data stream. These means are driven by the microprocessor of the processing unit 72.

Although the present disclosure has been described with reference to one or more examples, workers skilled in the art will recognize that changes may be made in form and detail without departing from the scope of the disclosure and/or the appended claims.

The invention claimed is:

1. A method for encoding at least one image or a sequence of at least one image, an image being formed by blocks of pixels grouped together in groups of standard size, wherein the method implements the following steps for at least one group of blocks of said at least one image or of an image of said sequence:
    determining, for each of the blocks of said group, at least one characteristic parameter of said block said characteristic parameter belonging to the group consisting of:
        a value of type of prediction encoding;
        a motion vector value;
        a zero prediction residue value;
        a value of type of transformation;
        a value of a coefficient of illumination compensation;
        a value of a coefficient of weighting of different predictions;
    within said at least one group, forming at least one cluster comprising blocks having at least one similar characteristic parameter, as a function of a result of said determining step, wherein blocks of said group that do not belong to any cluster are referred to as external blocks;
    encoding, with an encoding device, only once for said at least one cluster, said similar characteristic parameter associated with each of the blocks of said at least one cluster, wherein at least one characteristic parameter, whose type corresponds to the type of said at least one similar characteristic parameter and associated with each of the external blocks is not encoded;
    generating a data stream representing said at least one group, comprising pieces of information on encoding clusters and pieces of information on encoding external blocks, and
    inserting, into said data stream, at least one piece of information on partitioning defining a boundary within said at least one group, said boundary separating said external block or blocks from blocks belonging to said at least one cluster.

2. The method for encoding according to claim 1, wherein said external blocks of a group form at least one of the following:
    at least one row; or
    at least one column of said group.

3. The method for encoding according to claim 1, wherein said piece of information on partitioning of a group is representative of either:
    a vertical partitioning of said group, defined from a vertical shift, in terms of number of pixels or blocks relatively to the first pixel or block of said group according to a predetermined scanning order;
    or of a horizontal partitioning of said group defined from a horizontal shift, in terms of number of pixels or blocks relatively to the first pixel or block of said group according to a predetermined scanning order;
    or of a diagonal partitioning of said group, defined from at least one of a vertical or horizontal shift, in terms of number of pixels or blocks relative to the first pixel or block of said group according to a predetermined scanning order, and an angle of tilt relatively to a vertical or horizontal axis of said group.

4. A method for decoding a data stream representing at least one image or a sequence of at least one image, an image being formed by blocks of pixels grouped together in groups of standard size, wherein the method implements the following steps for at least one group of blocks encoded in said data stream:
    extracting at least one piece of information on partitioning defining a boundary within said at least one group, said boundary separating at least one block, known as an external block, from blocks belonging to any cluster of the at least one group, wherein the at least one external block does not belong to any cluster of the group, and wherein each cluster is formed by blocks of said group having at least one similar characteristic parameter, said at least one similar characteristic parameter belonging to the group consisting of:
        a value of type of prediction encoding;
        a motion vector value;
        a zero prediction residue value;
        a value of type of transformation;
        a value of a coefficient of illumination compensation;
        a value of a coefficient of weighting of different predictions;
    decoding, with a decoding device, the blocks of at least one cluster of said group, comprising:
        a step of decoding a block of said cluster implementing a decoding of said at least one similar characteristic parameter encoded only once for said at least one cluster, said at least one similar characteristic parameter being associated with each of the blocks of said at least one cluster; and
        a step of decoding other blocks of said cluster taking account of said previously decoded similar characteristic parameter; and decoding the external blocks, taking account of at least one characteristic parameter of the previously decoded neighboring blocks, said at least one characteristic parameter of the previously decoded neighboring blocks having a type corresponding to the type of said at least one similar characteristic parameter.

5. The method for decoding according to claim 4, wherein:
  when said piece of information on partitioning represents a vertical partitioning, the characteristic parameter associated with an external block takes the value of the characteristic parameter associated with the neighboring block situated directly to the left of said external block;
  when said piece of information on partitioning represents a horizontal partitioning, the characteristic parameter associated with an external block takes the value of the characteristic parameter associated with the neighboring block situated directly above said external block;
  when said piece of information on partitioning represents a diagonal partitioning, the characteristic parameter associated with an external block is equal to a combination of the values of the characteristic parameters associated with the neighboring blocks situated to the left and/or above and/or at the top left of said external block according to the position, in said group, of a diagonal partitioning line defined by said piece of information on partitioning.

6. A method comprising:
  generating a data stream with an encoding device, the data stream representing at least one image or a sequence of at least one image formed by blocks of pixels grouped together in standard sized groups, at least one of the standard sized groups comprising:
    at least one cluster comprising blocks having at least one similar characteristic, said similar characteristic being a characteristic parameter belonging to the group consisting of:
      a value of type of prediction encoding;
      a motion vector value;
      a zero prediction residue value;
      a value of type of transformation;
      a value of a coefficient of illumination compensation;
      a value of a coefficient of weighting of different predictions; and
    external blocks comprising at least one block of said at least one group that does not belong to any cluster,
  wherein said data stream carries:
    at least one piece of information on partitioning of said at least one group defining a boundary within said at least one group, said boundary separating said at least one external block from blocks belonging to said at least one cluster;
    pieces of information on cluster encoding obtained for at least one group during the encoding of the blocks of said at least one cluster, said at least one similar characteristic parameter associated with each of the blocks of said cluster being encoded only once for said cluster; and
    pieces of information on encoding said at least one external block , obtained for at least one group during the encoding of said at least one external block of said group, wherein at least one characteristic parameter, whose type corresponds to the type of said at least one similar characteristic and associated with each of the external blocks is not encoded; and
  transmitting the data stream.

7. A device for encoding at least one image or a sequence of at least one image, an image being formed by blocks of pixels grouped together in standard sized groups, wherein the device comprises the following means activated for at least one group of blocks of said at least one image or of the image of said sequence:
  means for determining, for each of the blocks of said group, at least one characteristic parameter of said block, said characteristic parameter belonging to the group consisting of:
    a value of type of prediction encoding;
    a motion vector value;
    a zero prediction residue value;
    a value of type of transformation;
    a value of a coefficient of illumination compensation;
    a value of a coefficient of weighting of different predictions;
  means for forming, within said at least one group, at least one cluster comprising the blocks having at least one similar characteristic parameter, as a function of a result of said determining means, wherein blocks of said group that do not belong to any cluster are referred to as external blocks;
  means for encoding only once for said at least one cluster, said similar characteristic parameter associated with each of the blocks of said at least one cluster, wherein at least one characteristic parameter, whose type corresponds to the type of said at least one similar characteristic parameter and associated with each of the external blocks is not encoded;
  means for generating a data stream representing said at least one group, comprising pieces of information on encoding clusters and pieces of information on encoding external block or blocks, and
  means for inserting, into the data stream, at least one piece of information on partitioning defining a boundary within said at least one group, said boundary separating said external block or blocks from blocks belonging to said at least one cluster.

8. A device for decoding a stream of data representing at least one image or a sequence of at least one image, an image being formed by blocks of pixels grouped together in groups of standard size, wherein the device comprises the following means, activated for at least one group of encoded blocks in said data stream:
  means for extracting at least one piece of information on partitioning defining a boundary within said at least one group, said boundary separating at least one block, known as an external block, from blocks belonging to any cluster of the at least one group, wherein the at least one external block does not belong to any cluster of the group, and wherein each cluster is formed by blocks of said group having at least one similar characteristic parameter, said at least one similar characteristic parameter belonging to the group consisting of:
    a value of type of prediction encoding;
    a motion vector value;
    a zero prediction residue value;
    a value of type of transformation;
    a value of a coefficient of illumination compensation;
    a value of a coefficient of weighting of different predictions;
  means for decoding the blocks of at least one cluster of said group, comprising:
    means for decoding a block of said cluster implementing a decoding of said at least one similar characteristic parameter encoded only once for said cluster, said at least one similar characteristic parameter being associated with each of the blocks of said at least one cluster;

means for decoding other blocks of said cluster taking account of said previously decoded similar characteristic parameter;

means for decoding the external blocks, taking account of at least one characteristic parameter of the previously decoded neighboring blocks, said at least one characteristic parameter of the previously decoded neighboring blocks having a type corresponding to the type of said at least one similar characteristic parameter.

9. A non transitory computer readable memory comprising a computer program stored thereon and comprising instructions for implementing a method of decoding a data stream representing at least one image or a sequence of at least one image, when the instructions are executed by a processor, an image being formed by blocks of pixels grouped together in groups of standard size, wherein the method implements the following steps for at least one group of blocks encoded in said data stream:

extracting at least one piece of information on partitioning of defining a boundary within said at least one group, said boundary separating at least one block, known as an external block, from blocks belonging to any cluster of the at least one group, wherein the at least one external block does not belong to any cluster of the group, and wherein each cluster is formed by blocks of said group having at least one similar characteristic parameter, said at least one similar characteristic parameter belonging to the group consisting of:
a value of type of prediction encoding;
a motion vector value;
a zero prediction residue value;
a value of type of transformation;
a value of a coefficient of illumination compensation;
a value of a coefficient of weighting of different predictions;

decoding the blocks of at least one cluster of said group, comprising:
a step of decoding a block of said cluster implementing a decoding of said at least one similar characteristic parameter encoded only once for said at least one cluster, said at least one similar characteristic parameter being associated with each of the blocks of said at least one cluster; and
a step of decoding other blocks of said cluster taking account of said previously decoded similar characteristic parameter; and decoding the external blocks, taking account of at least one characteristic parameter of the previously decoded neighboring blocks, said at least one characteristic parameter of the previously decoded neighboring blocks having a type corresponding to the type of said at least one similar characteristic parameter.

* * * * *